United States Patent
Gueret

(10) Patent No.: US 6,197,413 B1
(45) Date of Patent: Mar. 6, 2001

(54) ARTICLE MADE OF PLASTICS MATERIAL, A METHOD OF MANUFACTURE, AND A MOLDING COMPOSITION

(75) Inventor: Jean-Louis Gueret, Paris (FR)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 09/103,393

(22) Filed: Jun. 24, 1998

(30) Foreign Application Priority Data

Jul. 4, 1997 (FR) .................................................... 97 08503

(51) Int. Cl.⁷ ........................ A45D 33/00; A45D 40/00; B29C 43/02; B29K 105/04; B32B 7/02
(52) U.S. Cl. ........................ 428/297.4; 428/375; 428/332; 428/903
(58) Field of Search ................................ 428/297.4, 375, 428/332, 903

(56) References Cited

FOREIGN PATENT DOCUMENTS

| 0 438 339 A2 | 7/1991 | (EP) . |
|---|---|---|
| 1511615 | 2/1968 | (FR) . |
| 2 413 205 | 7/1980 | (FR) . |
| 2-180137 * | 7/1990 | (JP) . |
| 4-10831 | 1/1992 | (JP) . |
| 6-238690 | 8/1994 | (JP) . |
| 7-11755 | 1/1995 | (JP) . |

* cited by examiner

*Primary Examiner*—Richard Weisberger
(74) *Attorney, Agent, or Firm*—Oliff & Berridge, PLC

(57) ABSTRACT

The molded article comprises a matrix of transparent plastics material incorporating a filler that is essentially constituted by fibers, the filler comprising 1% to 25% by mass of the mixture and the mean length of the fibers constituting said filler lying in the range 100 μm to 700 μm.

10 Claims, No Drawings

ARTICLE MADE OF PLASTICS MATERIAL, A METHOD OF MANUFACTURE, AND A MOLDING COMPOSITION

The present invention relates to manufacturing articles molded out of plastics material, and more particularly, but not exclusively, to manufacturing devices for packaging cosmetics.

BACKGROUND OF THE INVENTION

French patent 2 413 205 and European patent 0 438 339 in the name of the Applicant company disclose methods of manufacturing articles of molded plastics material that make it possible to imitate the appearance of stone, of marble, or of mother-of-pearl.

Those methods make it possible, in particular, to improve the appearance of devices for packaging cosmetics.

Nevertheless, there exists a need to create novel optical effects so as to make such devices even more attractive to the consumer.

In addition, known methods do not give complete satisfaction since marking can be observed on the surface of certain articles due to the flow of the material during molding, and that detracts from the appearance thereof.

OBJECTS AND SUMMARY OF THE INVENTION

An object of the present invention is to remedy that drawback and to make packaging devices, particularly for cosmetics, even more attractive to the consumer.

The invention achieves this by an article made of molded plastics material, said article comprising a matrix of transparent plastics material incorporating a filler constituted essentially by fibers, said filler constituting 1% to 25% by mass, and the mean length of the fibers constituting said filler lying in the range 100 $\mu$m to 700 $\mu$m.

Preferably, the filler constitutes 1% to 15% by mass, advantageously 2% to 10%, and the mean length of the fibers preferably lies in the range 150 $\mu$m to 550 $\mu$m.

The proportions given above correspond to filler mass relative to total mass of filler plus transparent plastics material.

Also preferably, the filler is constituted by vegetable fibers, advantageously wood fibers, which fibers may be colored or made reflective by being encapsulated in colored or reflecting material.

In the meaning of the present invention, the term "fiber" should be understood as covering any generally oblong body of outline that is preferably irregular.

The plastics material used may be colored while nevertheless remaining transparent.

Opalescent effects may be created by acting on the surface state of the article, i.e. by giving parts of its surface a satin finish.

When the surface of the article is polished, it is also possible to create a magnifying glass effect.

The article can be shaped using any known method of molding thermoplastics material, such as injection molding, for example.

In general, the wall thickness of an article molded in accordance with the invention is at least 0.2 mm, and is preferably greater than or equal to 1 mm.

The invention also provides a method of manufacturing an article of molded plastics material as specified above, the method comprising the steps consisting in:

mixing a transparent plastics material with a filler that is essentially constituted by fibers, the filler constituting 1% to 25% by mass of the mixture and the mean length of the fibers lying in the range 100 $\mu$m to 700 $\mu$m; and molding the article.

The invention also provides a composition for molding, wherein the composition is essentially, or exclusively, constituted by a mixture of a transparent plastics material and a fiber filler, the filler constituting 1% to 25% by mass of the mixture, and said fibers constituting said filler having a mean length lying in the range 100 $\mu$m to 700 $\mu$m.

As the transparent plastics material, it is possible to use a thermoplastics material such as a styrene, e.g. polystyrene (PS), a polyolephin such as transparent polypropylene (PP), polyvinyl chloride (PVC), polyethylene terephthalate (PET), a polyacrylic (PMMA), or a copolymer such as, for example, styrene/acrylonitrile (SAN), said list naturally not being limiting.

It is also possible to use a mixture of transparent thermoplastics materials of different chemical natures.

MORE DETAILED DESCRIPTION

To make the invention easier to understand, there follows three non-limiting examples relating to the manufacture of caps for closing flasks using the following compositions:

EXAMPLE 1

Mixture comprising:

10% by mass wood fibers, mean length of the fibers being 250 $\mu$m and the density of the fibers lying in the range 0.11 g/cm$^3$ to 0.14 g/cm$^3$; and 90% by mass of transparent PP in the form of granules.

EXAMPLE 2

Mixture made up of:

15% by mass of wood fibers, the mean length of the fibers being 160 $\mu$m and the density of the fibers lying in the range 0.1 g/cm$^3$ to 0.135 g/cm$^3$; and 85% by mass transparent SAN in the form of granules.

EXAMPLE 3

Mixture made up of:

90% by mass transparent PP in the form of granules; and

10% by mass wood fibers, the mean length of the fibers being equal to 530 $\mu$m and the density of the fibers lying in the range 0.15 g/cm$^3$ to 0.17 g/cm$^3$.

Each of the three above mixtures was heated and extruded and then molded by means of an injection molding device of a kind that is known per se.

The temperature of the plastics material was about 170° C.±25° C.

It will be observed that the density of the fibers used lay as a general rule in the range 0.1 g/cm$^3$ to 0.2 g/cm$^3$.

In the third example, the surface of the mold had a satin finish in places so as to obtain an opalescent effect.

To the naked eye, all three caps showed no sign of material flow traces.

It may also be observed that on examining the caps, in spite of a transparent plastics material being used, the dispersed fibers formed a screen making it impossible to see clearly through the walls thereof.

When the transparent material is colorless, then the color of the article is given by the color of the fibers.

In addition, depending on the quantity of fibers injected into the transparent plastics material matrix, different optical effects are obtained.

Thus, to give the impression firstly that the article is covered in a shiny varnish on its outside surface that can be seen by an observer, and secondly that the fibers are confined to the inside surface of the article, the quantity of fibers used should be relatively small, and the surface of the mold should be polished.

It should be observed that this optical effect is obtained only when using a filler constituted by fibers and only when the fibers are of a size lying in the range characterizing the invention.

Thus, tests performed by adding a sufficient quantity of pigment to the transparent plastics material to cause it to lose its transparency, have shown that the resulting article ceased to benefit from the advantages of the invention.

Without going beyond the scope of the invention, it is also possible to use a transparent plastics material that is bulk colored by means of a soluble liquid or other dye, an optical bleach or whitening agent, or an anti-UV agent, so long as the material remains transparent.

By acting on the color and/or the concentration of fibers, it is possible to modify the color of the article and also to give the illusion to an observer that the change in the color of the article comes from a modification to the color of the transparent plastics material used.

This provides a practical way of compensating for possible differences in tint between successive batches of the transparent colored plastics material used in manufacturing a series of articles.

To color the fibers, it is preferable to use an encapsulation method that is known per se, which method consists in coating the fibers in a colored material that does not discolor the transparent plastics material on coming into contact therewith.

This provides optical effects that are particularly advantageous and original by using fibers that have been made reflective.

Finally, as explained above, the invention makes it possible, surprisingly, to eliminate marking associated with the flow of the material during molding.

Naturally, it would not go beyond the ambit of the invention to use a fiber filler constituted by a mixture of vegetable fibers of different lengths, a mixture of encapsulated vegetable fibers together with non-encapsulated vegetable fibers, or replacing vegetable fibers by synthetic fibers or mineral fibers that provide a similar result.

What is claimed is:

1. A molded article, comprising a matrix of transparent plastics material incorporating a filler consisting essentially of vegetable fibers, said filler constituting 1% to 25% by mass of the molded article and the mean length of the fibers constituting said filler lying in the range of 100 $\mu$m to 700 $\mu$m.

2. An article according to claim 1, wherein said filler consists essentially of wood fibers.

3. A molded article, comprising a matrix of transparent plastics material incorporating a filler consisting essentially of fibers, said filler constituting 1% to 25% by mass of the molded article and said filler having a density lying in the range of 0.1 g/cm$^3$ to 0.2 g/cm$^3$, the mean length of the fibers constituting said filler lying in the range of 100 $\mu$m to 700 $\mu$m.

4. A molded article, comprising a matrix of transparent plastics material incorporating a filler consisting essentially of fibers, said filler constituting 1% to 25% by mass of the molded article and the mean length of the fibers constituting said filler lying in the range of 100 $\mu$m to 700 $\mu$m, said fibers being colored or made reflective by being encapsulated in a colored or reflecting material.

5. A molded article, comprising a matrix of colored transparent plastics material incorporating a filler consisting essentially of fibers, said filler constituting 1% to 25% by mass of the molded article and the mean length of the fibers constituting said filler lying in the range of 100 $\mu$m to 700 $\mu$m.

6. The molded article according to claim 5, constituting all or a part of a device for packaging a cosmetic.

7. The molded article according to claim 4, constituting all or a part of a device for packaging a cosmetic.

8. The molded article according to claim 3, constituting all or a part of a device for packaging a cosmetic.

9. The molded article according to claim 2, constituting all or a part of a device for packaging a cosmetic.

10. The molded article according to claim 1, constituting all or a part of a device for packaging a cosmetic.

* * * * *